Oct. 29, 1968     A. MAZURKEVICS     3,408,562
TEMPERATURE COMPENSATED TESTER FOR VOLTAGE REGULATORS
Filed Oct. 23, 1965
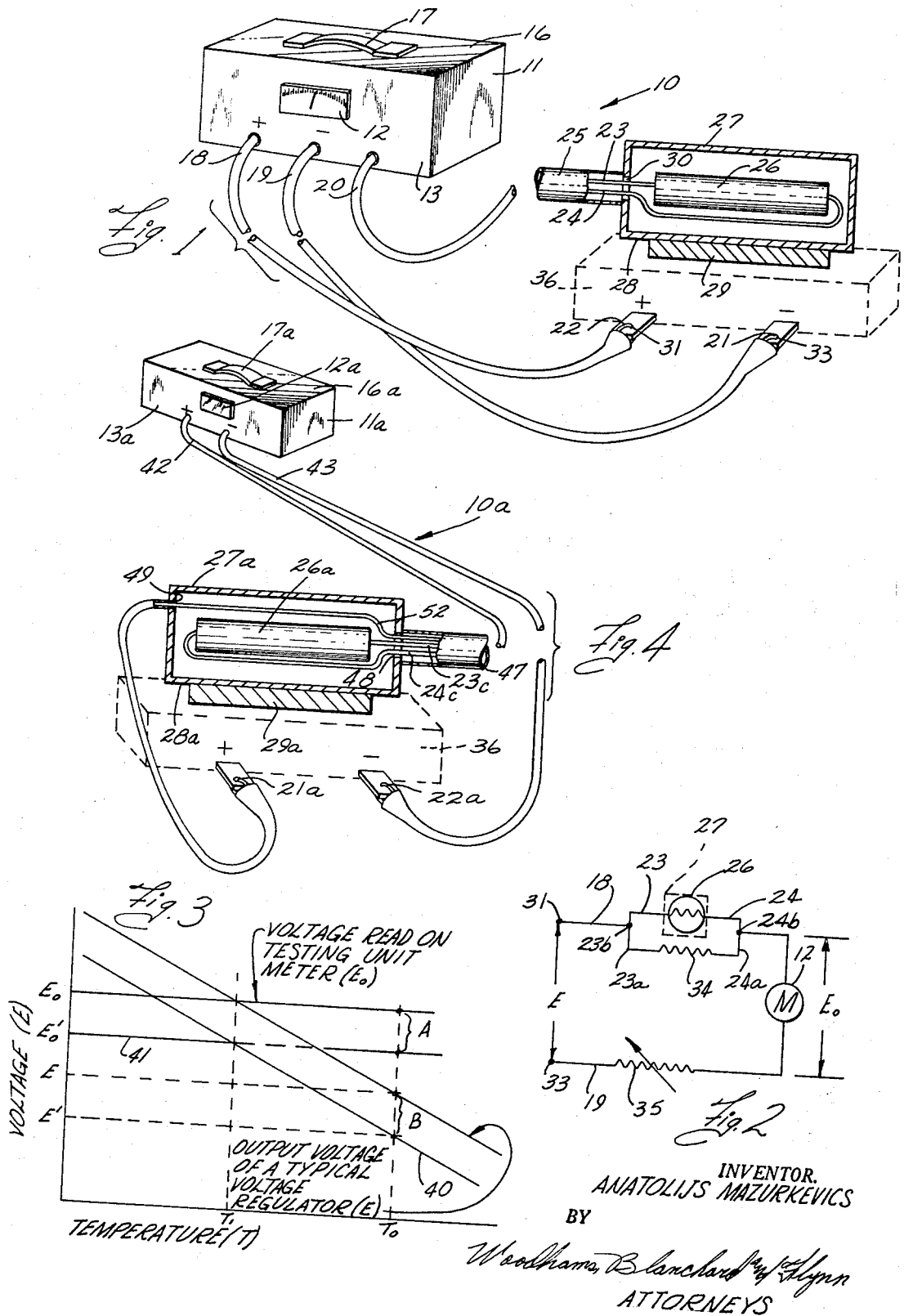
INVENTOR.
ANATOLIJS MAZURKEVICS
BY
Woodhams, Blanchard & Flynn
ATTORNEYS

United States Patent Office 3,408,562
Patented Oct. 29, 1968

3,408,562
TEMPERATURE COMPENSATED TESTER FOR VOLTAGE REGULATORS
Anatolijs Mazurkevics, Kalamazoo, Mich., assignor to Allen Electric and Equipment Company, Kalamazoo, Mich., a corporation of Michigan
Filed Oct. 23, 1965, Ser. No. 503,906
6 Claims. (Cl. 324—28)

ABSTRACT OF THE DISCLOSURE

A temperature compensated testing arrangement for testing the voltage across the output terminals of a voltage regulator taking into consideration the ambient temperature of the air surrounding said voltage regulator and temperature sensitive means connected in series with a meter circuit to achieve a temperature compensated reading.

---

This invention relates to a temperature compensated tester for automobile voltage regulators, and more particularly, relates to the use of a temperature sensitive means in series with a meter circuit to achieve a temperature compensated circuit.

It is well known in the field that the output voltage of automotive voltage regulators is sensitive to the ambient temperature. That is, the output voltage of the usual type of voltage regulator varies inversely as the ambient temperature.

In view of this, many methods are currently employed to obtain proper compensation in the testing of the output voltage of voltage regulators. One of the methods presently employed involves the use of two separate units, a thermometer and a testing unit. The thermometer is releasably attached to the voltage regulator and consists of a scale which is calibrated in degrees of temperature and corresponding voltage values. The operator first reads the ambient temperature and the corresponding voltage value on the thermometer then attaches the testing unit to the output terminals of the voltage regulator and adjusts the output voltage to correspond to the voltage value read on the thermometer. This is a very slow and cumbersome process. As a result, inexperienced operators often omit the use of the thermometer with resulting inaccuracy in the adjustment of the regulator.

Accordingly, the objects of this invention include:

(1) To provide a testing unit which automatically correlates temperature and corresponding voltage values in order to arrive at a voltage value at which to adjust the output voltage of a voltage regulator.

(2) To further provide a testing unit which makes it highly improbable, if not impossible, for the operator to leave out the ambient temperature function in adjusting the voltage regulator output.

(3) To further provide a testing unit which provides an accurate output voltage reading with variations in ambient temperature which in turn will allow for an accurate voltage regulator output adjustment.

(4) To further provide a unit which is relatively inexpensive.

(5) To further provide an operator with a one piece testing unit which is simple to operate.

Further objects and purposes of this invention will become apparent to persons familiar with this type of equipment upon reading the following specification and examining the accompanying drawings, in which:

FIGURE 1 is an oblique view of a temperature compensated testing unit embodying the invention.

FIGURE 2 is an electrical schematic of the testing unit.

FIGURE 3 is a graph indicating the output voltage versus temperature characteristics of a conventional voltage regulator in which the invention is designed to be used.

FIGURE 4 is an oblique view of a modification of the device shown in FIGURE 1.

General description

The objects and purposes of the invention, including those set forth above, have been met by providing a device in which the ambient temperature is compensated for by the use of a temperature sensing circuit. The temperature sensing circuit is embedded in a small compact enclosure external to a first enclosure containing an ammeter, and is connected in series to the ammeter and is calibrated to read voltage. In this embodiment, the temperature sensing means comprises a resistance having a negative temperature coefficient, more commonly known as a thermistor. The use of this terminology is in no way intended to have a limiting effect.

Detailed description

The testing unit 10 (FIGURE 1) comprises an enclosure 11 having four side walls, a top and a bottom wall, and contains an ammeter 12 calibrated to read voltage. Mounted on the top wall 16 of enclosure 11 is a handle 17 for easily transporting said enclosure 11 from one place to another in the work shop.

Extending from the front wall 13 of enclosure 11 are three electrical leads 18, 19 and 20. Electrical leads 18 and 19 each consist of a single conductor, are integrally a part of the circuit (FIGURE 2) and consist, at their outermost ends, of a pair of clips 21 and 22, respectively. Electrical lead 20 consists of a pair of conductors 23 and 24 carried in a common harness 25. At the outermost end of harness 25 is connected a small enclosure 27 having a small opening 30 in one end. Conductors 23 and 24 pass through the opening 30 and are connected in series through a thermistor 26.

Mounted on the bottom wall 28 of the enclosure 27 is a small magnet 29 so that the thermistor containing enclosure 27 can be releasably attached to the structure of the voltage regulator 36.

The circuitry shown in FIGURE 2 comprises a simple series circuit. Starting at the outermost end at the positive terminal 31, conductor 18 is connected through conductor 23 to one end of the thermistor 26. The thermistor is connected in parallel to a resistor 34 through conductors 23 and 23a and terminal 23b on its one end and conductors 24 and 24a and terminal 24b on its other end. Said other end of the thermistor 26 is connected from conductor 24 to one end of the ammeter 12. The other end of the ammeter 12 is connected to one end of an adjustable resistor 35 and the other end of the adjustable resistor 35 is connected through conductor 19 to the negative terminal 33.

The adjustable resistor 35 is within the enclosure 11 and is adjusted prior to the use of the testing unit 10 preferably at the factory. Adjusting the resistance value of resistor 35 adjusts the ammeter 12 to read a true selected value of voltage at a preselected temperature. After the unit has been adjusted any fluctuation in the ambient temperature will be compensated for by the thermistor 26.

The purpose of the thermistor 26 is to provide a resistance versus temperature characteristic similar to that of the output voltage versus temperature characteristic shown in FIGURE 3. That is, as the temperature increases the resistance decreases. Thus, in applying Ohm's Law, $E=IR$, as the ambient temperature varies, the output voltage of a voltage regulator E varies inversely along with the resistance R. Therefore, a careful selection of the thermistor 26 and resistances 34 and 35 will result in a constant current being fed to the ammeter 12. Since the ammeter is calibrated to read voltage, a constant voltage is read on the face of the meter 14.

FIGURE 3 is a graph of the output voltage versus temperature characteristic of a typical voltage regulator. When the positive and negative terminals, 31 and 33, respectively, are connected to the respective output terminals of the voltage regulator by clips 21 and 22, at a temperature $T_0$, the voltage at the output terminals of the voltage regulator is E volts, while the voltage read on the testing unit meter 12 is $E_0$ volts. $E_0$ volts represents the voltage to which the voltage regulator is adjusted at room temperature $T_1$. It is to be noted that at room temperature $T_1$, the output voltage of a typical voltage regulator and voltage read on testing unit meter are identical. Thus, with variations in the ambient temperature, the output voltage E of the typical voltage regulator will vary also. However, the voltage read on the testing unit meter 12 remains constant at $E_0$ volts.

Operation

To further make clear the operation of the testing unit 10, a sample voltage regulator adjustment will be illustrated, assuming that the testing unit has been previously calibrated at a preselected temperature by the adjustment of resistor 35. First, the thermistor enclosure 27 is magnetically attached to the voltage regulator structure 36 to subject same to the same ambient temperature as that influencing the voltage regulator being adjusted. The conductors 18 and 19, respectively, are connected to the respective output terminals of a voltage regulator by clips 21 and 22. If the voltage regulator is out of adjustment, it will have a voltage versus temperature characteristic as indicated by the line 40, whereas the voltage read on the meter 12 will be $E_0'$ volts represented by the line 41. At a temperature of $T_0$, the output voltage of the faulty voltage regulator is E' volts while the corresponding voltage read on the testing unit meter 12 is $E_0'$ volts. The operator is instructed to adjust the output voltage of the faulty voltage regulator until $E_0$ volts is read on the testing unit meter 12. $E_0$ volts read on the testing unit meter 12 corresponds to the output voltage E of the typical voltage regulator under consideration, at temperature $T_0$. Thus, in this particular illustration, the operator must adjust the output voltage of the faulty voltage regulator upward from a value of $E_0'$ volts read on the testing unit meter 12, to a value of a $E_0$, or a difference in value illustrated by the bracket A in FIGURE 3. The effect of this adjustment is to change the output voltage of the faulty voltage regulator from a value E' volts at temperature $T_0$ to a value of E volts, or a difference of value illustrated by the bracket B in FIGURE 3. The value represented by bracket A is equal to the value represented by bracket B.

A modification of the testing unit 10a is illustrated in FIGURE 4. The testing unit 10a comprises an enclosure 11a having four side walls, a top wall and a bottom wall, and contains an ammeter 12a calibrated to read voltage. Mounted on the top wall 16a of enclosure 11a is a handle 17a.

Extending from the front wall 13a of enclosure 11a are two electrical leads 42 and 43. Electrical lead 43 consists of a single conductor with a clip 22a connected at its outermost end. Electrical lead 42 consists of three conductors 23c, 24c and 52 carried in a common harness 47. At the outermost end of harness 47 is connected a small enclosure 27a having openings 48 and 49 in the end walls. Mounted on the bottom wall 28a of the enclosure 27a is a small magnet 29a so that the enclosure can be releasably attached to the structure of the voltage regulator 36. Conductors 23c, 24c and 52 pass through opening 48 in one end of the enclosure 27a. Conductors 23c and 24c are connected in series through a thermistor 26a mounted inside the enclosure 27a.

Conductor 52 passes through the opening 49 in the other end of the enclosure 27a and is connected, at its outermost end, to a clip 21a. The length of the conductor 52 from the opening 49 to the clip 21a is very short. The reason for this very short portion is to prevent the operator from putting the temperature sensing means (thermistor 26a) at some distance away from the voltage regulator 36. If the conductor is short, it will force the operator to magnetically couple by magnet 29a the thermistor enclosure 27a near to the voltage regulator 36 being adjusted. As a result, by using the modified testing unit 10a the operator cannot leave out the ambient temperature function in adjusting a voltage regulator.

While the foregoing description has assumed the use of a magnet on the enclosure 27 or 27a for the purpose of temporarily fastening the temperature sensitive unit 26 or 26a onto the voltage regulator, it will be recognized that other forms of temporary fastening means, such as clamps, may be used if desired. Also it will be recognized that the same broad objectives may be accomplished by using a temperature sensitive unit whose resistance varies directly porportioned to the temperature and connecting same in parallel with the meter.

Although particular preferred embodiments of the invention have been disclosed above in detail for illustrated purposes, it will be understood that variations or modifications of such structure, which come within the scope of the appended claims, are fully contemplated.

The embodiments of the invention in which an exclusive property or privilege is claimed are defined as follows:

1. A temperature compensated testing arrangement for testing the voltage across the output terminals of a voltage regulator taking into consideration the ambient temperature of the air surrounding said regulator, the combination comprising:

means defining a housing having a pair of terminals therein;

a meter mounted on said housing sensitive to the output voltage of said voltage regulator;

means defining an enclosure means having temperature sensing means mounted inside thereof and a permanent magnet mounted on said enclosure means for removably mounting said enclosure means on said voltage regulator, said temperature sensing means having a resistance characteristic which varies inversely as the ambient temperature of the air surrounding said voltage regulator and having first and second elongated conductors connected in circuit therewith and extending between said housing and said enclosure means;

said first conductor being connected in circuit with one of said terminals and said second conductor being connected in circuit with the other of said terminals and one side of said meter;

third and fourth conductors extending outwardly of said housing having gripping means connected in circuit therewith at the outermost ends thereof, said third conductor being connected in circuit with said one of said terminals and said fourth conductor being connected in circuit with the other side of said meter;

whereby said enclosure means is releasably and magnetically attachable to said voltage regulator and said first and second gripping means are releasably attachable to said output terminals so that the ambient temperature of the air surrounding said voltage regulator will be detected and said meter will provide a constant predetermined reading when said voltage regulator is correctly adjusted regardless of ambient temperature.

2. A device as defined in claim 1 including also a resistor connected across said pair of terminals to provide a parallel combination with said temperature sensing means.

3. The device defined in claim 1 including also a resistor interposed between said fourth conductor and said other end of said meter.

4. A device as defined in claim 1, wherein said temperature sensing means is a temperature sensitive impedance.

5. A device as defined in claim 3, wherein said temperature sensitive impedance is a thermistor.

6. The device defined in claim 1 wherein one of said third and fourth conductors extends through said enclosure means in fixed relationship therewith to limit the distance that the said enclosure means can be spaced from the voltage regulator.

References Cited

UNITED STATES PATENTS

| 1,446,995 | 2/1923 | Sines | 324—105 |
| 2,826,737 | 3/1958 | Crumbliss | 324—73 XR |
| 3,106,676 | 10/1963 | Slater | 324—105 XR |

RUDOLPH V. ROLINEC, *Primary Examiner.*

E. L. STOLARUN, *Assistant Examiner.*